(12) United States Patent
Kobayashi et al.

(10) Patent No.: US 10,252,187 B2
(45) Date of Patent: Apr. 9, 2019

(54) GAS SUBSTITUTION APPARATUS

(71) Applicant: DAIEI SEISAKUSHO CORPORATION, Toyohashi-shi, Aichi (JP)

(72) Inventors: Kazuyoshi Kobayashi, Toyohashi (JP); Hideo Morita, Toyohashi (JP); Norihito Ito, Toyohashi (JP)

(73) Assignee: DAIEI SEISAKUSHO CORPORATION, Aichi (JP)

( * ) Notice: Subject to any disclaimer, the term of this patent is extended or adjusted under 35 U.S.C. 154(b) by 79 days.

(21) Appl. No.: 15/506,986

(22) PCT Filed: May 2, 2016

(86) PCT No.: PCT/JP2016/063592
§ 371 (c)(1),
(2) Date: Feb. 27, 2017

(87) PCT Pub. No.: WO2017/191678
PCT Pub. Date: Nov. 9, 2017

(65) Prior Publication Data
US 2018/0154283 A1 Jun. 7, 2018

(51) Int. Cl.
*B01D 19/00* (2006.01)
*B01F 3/04* (2006.01)
*C02F 1/20* (2006.01)
*C02F 101/16* (2006.01)

(52) U.S. Cl.
CPC ......... *B01D 19/0005* (2013.01); *B01D 19/00* (2013.01); *B01D 19/0021* (2013.01); *B01F 3/04099* (2013.01); *C02F 1/20* (2013.01); *C02F 2101/16* (2013.01)

(58) Field of Classification Search
CPC ................................ B01F 3/04; B01F 3/04099

USPC .......................................... 210/752, 758, 199
See application file for complete search history.

(56) References Cited

U.S. PATENT DOCUMENTS 5,171,405 A    12/1992   Torregrossa

FOREIGN PATENT DOCUMENTS

| EP | 0 478 528 A1 | 4/1992 |
| JP | 4-247291 A | 9/1992 |
| JP | 2008-086896 A | 4/2008 |

OTHER PUBLICATIONS

International Search Report dated Jul. 19, 2016, issued in counterpart International Application No. PCT/JP2016/063592 in Japanese (3 pages).

(Continued)

*Primary Examiner* — Robert A Hopkins
(74) *Attorney, Agent, or Firm* — Westerman, Hattori, Daniels & Adrian, LLP

(57) ABSTRACT

The ventilation pipe 60 having the openings at both the ceiling side and the bottom side is provided in the area where the rectification boards 50a to 50f are arranged, thereby nitrogen released from water (nitrogen released from water based on that gas dissolved in water is substituted by oxygen) can be moved to the ceiling side of the retainer body through the ventilation pipe 60. Thereby, nitrogen can be effectively exhausted from the exhaust opening 30a, thus it can be restrained that nitrogen is accumulated in the retainer body 10. Accordingly, it can be restrained that oxygen concentration (partial pressure) in the retainer body 10 decreases. Since oxygen quantity dissolved in water is increased, gas dissolved in water can be effectively substituted.

8 Claims, 5 Drawing Sheets

(56) References Cited

OTHER PUBLICATIONS

Notification of Transmittal of Translation of the International Preliminary Report on Patentabililty (Form PCT/IB/326) issued in counterpart International Application No. PCT/JP2016/063592 dated Nov. 15, 2018 with Forms PCT/IB/373, PCT/IB/338, and PCT/ISA/237 (15 pages).

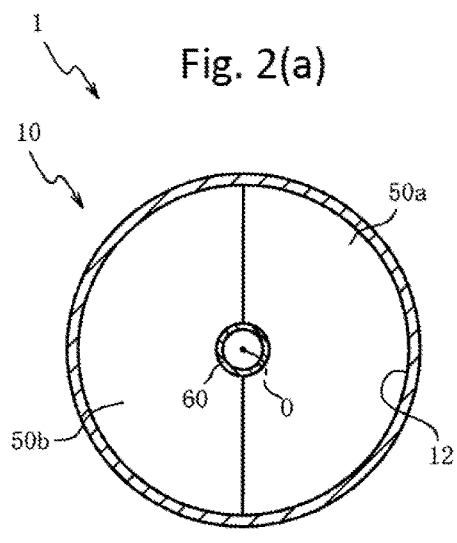
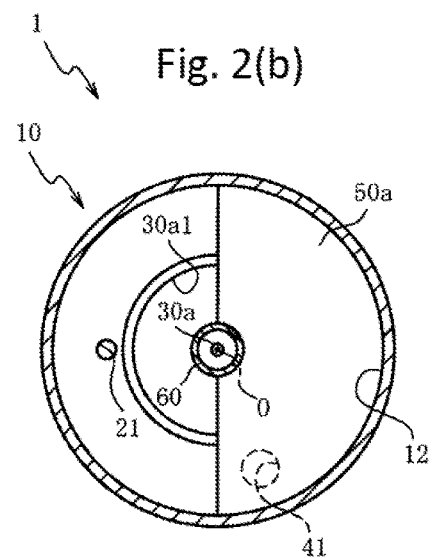
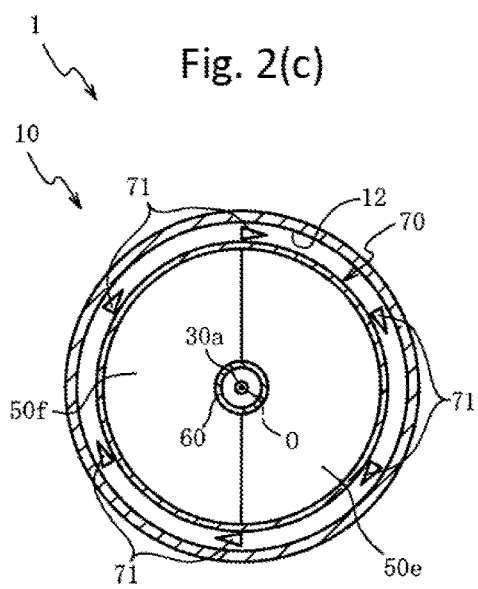
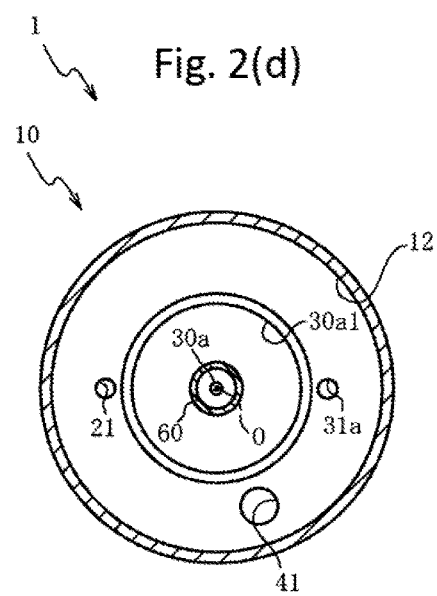

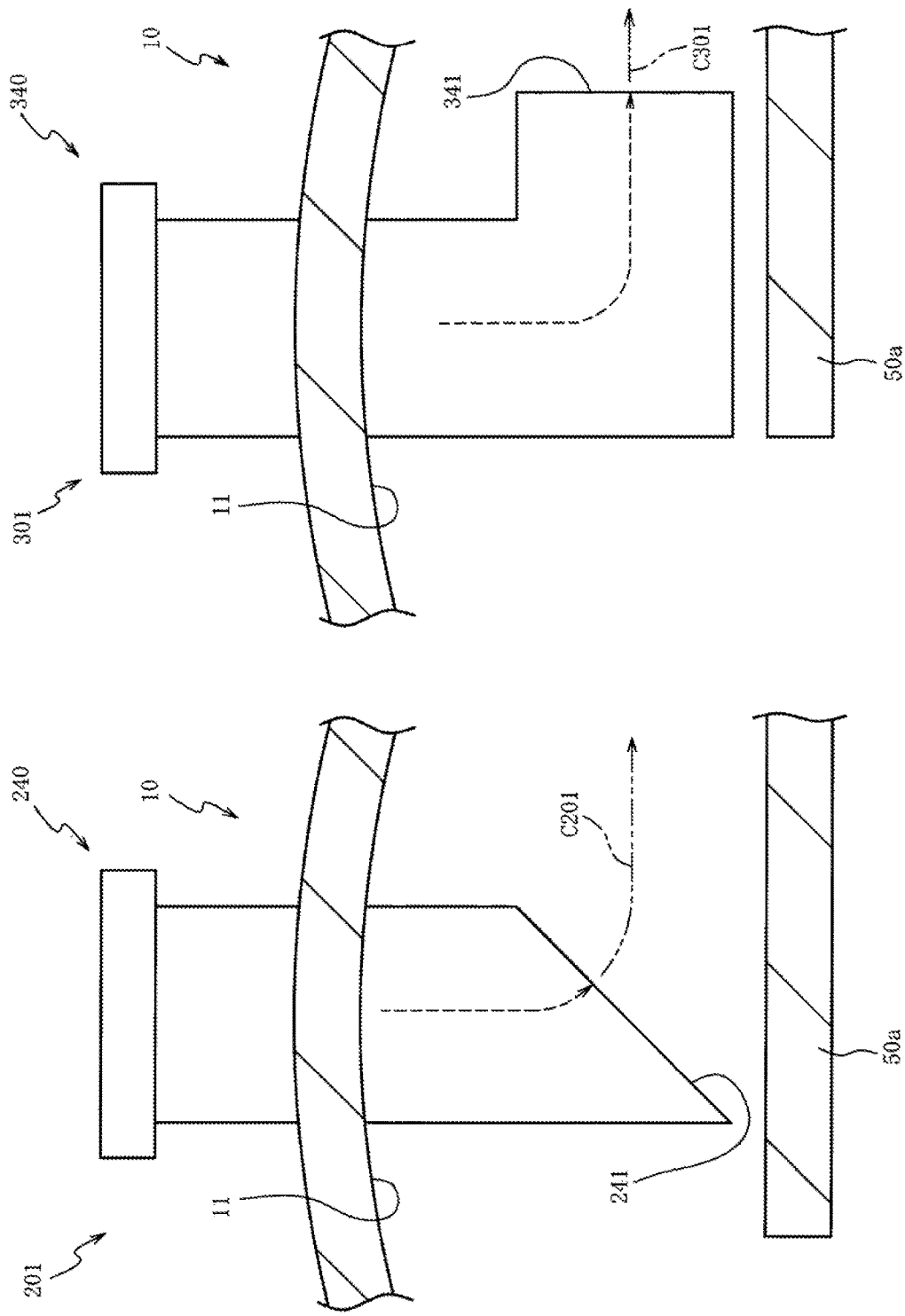

GAS SUBSTITUTION APPARATUS

TECHNICAL FIELD

The present invention relates to a gas substitution apparatus.

BACKGROUND ART

Conventionally, it is well-known a gas substitution apparatus in which an inside of a retainer body is filled with gas (for example, oxygen), and is pressurized, thereafter liquid (for example, water) flows downward within the inside of the retainer body, thereby gas dissolved in liquid from a beginning (gas existing in the liquid from a beginning under atmospheric pressure, for example, nitrogen) is substituted by gas filling the inside of the retainer body (for example, oxygen) (that is to say, for example, gas dissolved in water is substituted from nitrogen by oxygen).

For example, in Patent Literature 1, a gas substitution apparatus is disclosed in which liquid (for example, water) is discharged toward upper direction in the inside of the retainer body filled with gas (for example, oxygen) and liquid flows downward along a rectification board arranged in the retainer body. In this gas substitution apparatus, liquid flows downward along the rectification board, thereby gas dissolved in liquid is substituted by gas (for example, oxygen) filling the retainer body.

CITATION LIST

Patent Literature

PTL 1: JP-A 2008-086896 (for example, FIG. 1)

SUMMARY OF INVENTION

Technical Problem

Here, gas dissolved in liquid (for example, water) is substituted by gas (for example, oxygen) filling the inside of the retainer body, thereby gas (for example, nitrogen) dissolved in liquid from a beginning is released from liquid.

In this case, according to the related art mentioned above, since gas substitution apparatus has the construction in which liquid (for example, water) uniformly flows downward along each rectification board, gas (dissolved in liquid from a beginning, for example, nitrogen) released from liquid (for example, water) by substitution is suppressed to move toward a ceiling of the retainer body by liquid flowing downward. That is to say, when gas (for example, nitrogen) released from liquid (for example, water) by substitution is accumulated in the retainer body, concentration (partial pressure) of gas (for example, oxygen) filling the retainer body is lowered. Therefore, there is a problem that gas dissolved in liquid cannot, be effectively substituted by gas (for example, oxygen) filling the retainer body.

The present invention has been made to address the above problem and has an object to provide a gas substitution apparatus through which gas dissolved in liquid (for example, water) can be effectively substituted by gas (for example, oxygen) filling an inside of retainer body.

Solution to Problem

In order to accomplish the object, the gas substitution apparatus according to the present invention includes:

a retainer body filled with gas under a state that the gas is pressurized more than an atmospheric pressure;

a supply opening for supplying the gas in the retainer body;

a rectification board formed so as to protrude from an inner surface wall of the retainer body and is extended along the inner surface wall;

an inflow opening arranged at an upper position than the rectification board and letting liquid flow in an inside from an outside of the retainer body;

an outflow opening connected to a lower end of the inner surface wall and letting the liquid flowing down to a bottom of the retainer body flow out of the outside of the retainer body; and an exhaust opening arranged at an upper position than the rectification board and exhausting the gas in the inside of retainer body to the outside of the retainer body;

wherein a ventilation path having openings at both a ceiling side and a bottom side of the retainer body in an area where the rectification board is arranged, and wherein the ventilation path and a flow path through which the liquid flows down are partitioned.

Advantageous Effects of the Invention

According to the gas substitution apparatus in a first aspect, it is provided in the area where the rectification board is arranged the ventilation path having the openings at both the ceiling side and the bottom side of the retainer body. Therefore, gas (for example, nitrogen) released from liquid (for example, water) by substitution can be moved to the ceiling side of the retainer body through the ventilation path and can be exhausted from the exhaust opening. Thereby, it can be restrained that concentration (partial pressure) of gas (for example, oxygen) filling the retainer body decreases, accordingly there is an effect that gas dissolved in liquid can be effectively substituted by gas (for example, oxygen) filling the retainer body.

Further, since the flow path through which liquid (for example, water) flows down and the ventilation path are partitioned, it can be restrained that gas (for example, nitrogen) released from liquid and liquid mutually contact. Therefore, there is an effect that gas dissolved in liquid can be effectively substituted by gas (for example, oxygen) filling the retainer body.

According to the gas substitution apparatus in a second aspect, in addition to effects obtained by the gas substitution apparatus in the first aspect since the inner surface wall is formed so as to have a circular section, and the rectification board is extended in spiral along the inner surface wall, liquid (for example, water) discharged from inflow opening can be rotated along the peripheral direction of the inner surface wall.

Thereby, cavities without liquid are formed near the axis of the inner surface wall by centrifugal force of liquid flowing down and gas (for example, nitrogen) released from liquid by substitution and liquid are separated (gas with smaller mass than liquid gathers near the axis of the inner surface wall by centrifugal force). Therefore, gas (for example, nitrogen) released from the liquid by substitution can be moved to the ceiling side and can be effectively exhausted from the exhaust opening. Thereby, there is an effect: it can be restrained that concentration (partial pressure) of gas (for example, oxygen) filling the retainer body decreases, thereby gas dissolved in liquid can be effectively substituted with gas (for example, oxygen) filling the retainer body.

Furthermore, since the rectification, board is extended in spiral and liquid discharged from the inflow opening rotates in the peripheral direction of the inner surface wall, thin water membrane can be formed on the surface of the rectification board. Thereby, since contact chance of gas (for example, oxygen) filling the retainer body and liquid can be increased, there is an effect that gas dissolved in liquid can be effectively substituted with gas (for example, oxygen) filling the retainer body.

According to the gas substitution apparatus in a third aspect, in addition to effects obtained by the gas substitution apparatus in the second aspect, since a plurality of the rectification boards are arranged in an axial direct ion of the inner surface wall, and the rectification boards are arranged so as to divide a spiral and each of the rectification boards is arranged so as to be mutually separated at a divided portion in the axial direction of the inner surface wall. Therefore, liquid (for example, water) becoming thin water membrane rectified by the rectification boards flows (drops) down the steps at the divided portions of the plural rectification boards, thereby contact chance of gas (for example, oxygen) filling the retainer body and liquid can be increased (while dropping on the steps, entire surface of water membrane can be exposed to gas (for example, oxygen) filling the retainer body). Therefore, there is an effect that gas dissolved in liquid can be effectively substituted by gas (for example, oxygen) filling the retainer body.

According to the gas substitution apparatus claim in a fourth aspect, in addition to effects obtained by the gas substitution apparatus in the second or third aspects since the radial ventilation path is arranged at an axial side of the inner surface wall nearer than the rectification board, a part of cavities formed near the axis of the inner surface wall by liquid (for example, water) flowing down while rotating can become the ventilation path, there is an effect that space to provide the ventilation path can be omitted and product cost of the gas substitution apparatus can be restrained.

Further, since the exhaust opening is arranged at a position at least overlapping with the opening formed on the ceiling side of the ventilation path when seen from an axial direction of the inner surface wall, gas (for example, nitrogen) released from liquid by substitution can be moved to the ceiling side through the ventilation path and can be effectively exhausted from the exhaust opening. Thereby, it can be restrained that concentration (partial pressure) of gas (for example, oxygen) filling the retainer body decreases and there is an effect that gas dissolved in liquid can be effectively substituted by gas (for example, oxygen) filling the retainer body.

According to the gas substitution apparatus in a fifth aspect, in addition to effects obtained by the gas substitution apparatus in the fourth aspect, it is provided a radial contract member arranged at a lower position than the area where the rectification board is arranged, the radial contract member being formed as a wall with a cone shape becoming narrower toward the bottom side, and an outer periphery of an upper end of the radial contract member is connected to the inner surface wall and an opening portion is formed at a lower end of the radial contract member. Thereby, liquid (for example, water) flowing down to the radial contract member retains centrifugal force and whirlpool can be generated in liquid accumulated to the bottom of the retainer body.

Thereby, since bubbles of gas (for example, nitrogen) released from liquid by substitution float on the liquid surface while gathering to the center of whirlpool by centrifugal force, gas (for example, nitrogen) released from liquid by substitution can be moved to the ceiling side through the ventilation path and can be effectively exhausted from the exhaust opening. Therefore, it can be restrained that concentration (partial pressure) of gas (for example, oxygen) filling the retainer body decreases and there is an effect that gas dissolved in liquid can be effectively substituted by gas (for example, oxygen) filling the retainer body.

According to the gas substitution apparatus in a sixth aspect, in addition to effects of the gas substitution apparatus in the fifth aspect, since it is provided communication openings formed at an upper end side of the radial contract member, the communication openings through which an inner peripheral side and an outer peripheral side of the radial contract member communicate, bubbles of gas (for example, nitrogen) released from liquid (for example, water) by substitution can be moved from the outer peripheral side to the inner peripheral side of the radial contract member. Thereby, it can be restrained that gas for example, nitrogen) released from liquid by substitution is accumulated to the bottom side (outer peripheral side of the radial contract member) of the retainer body. Therefore, it can be restrained that concentration (partial pressure) of gas (for example, oxygen) filling the retainer body decreases, and therein an effect that gas dissolved in liquid can be effectively substituted by gas (for example, oxygen) filling the retainer body.

According to the gas substitution apparatus in a seventh aspect in addition to effects of the gas substitution apparatus in the sixth aspect, since it is provided a buffer member arranged at a lower position than the opening portion, it can be restrained that liquid (for example, water) flowing down from the opening portion formed at the lower end of radial contract member and the bottom surface (liquid accumulated to the bottom of the retainer body) of the retainer body mutually collide and that gas (for example, oxygen) dissolved in liquid by substitution is released from liquid. Therefore, there is an effect that gas dissolved in liquid can be effectively substituted by gas (for example, oxygen) filling the retainer body.

Further, since the buffer member has a concave surface concaved toward the bottom side of the retainer body, a flow toward the upward along the concave surface of the buffer member is formed, thereby bubbles of gas (for example, nitrogen) released from liquid by substitution can be moved toward the inner peripheral side of the radial contract member through the communication openings. Therefore, since it can be restrained that gas (for example, nitrogen) released from liquid by substitution is accumulated to the bottom side of the retainer body (outer peripheral side of the radial contract member), it can be restrained that concentration (partial pressure) of gas (for example, oxygen) filling the retainer body decreases. Thus, there is an effect that gas dissolved in liquid can be effectively substituted by gas (for example, oxygen) filling the retainer body.

According to the gas substitution apparatus in an eighth aspect, in addition to effects of the gas substitution apparatus in any of the fourth to seventh aspects, the lower end of the ventilation path is positioned at an upper position than a lower end of the area where the rectification boards are arranged. Therefore, even if liquid level of liquid (for example, water) accumulated to the bottom of the retainer body is positioned at a position lower than the lower end of the ventilation path, the flow path of rotating liquid can be formed in the surrounding of the space between the lower end of the ventilation path and liquid level. Thereby, gas (for example, nitrogen) released from liquid by substitution can be moved toward the ceiling side through the ventilation path and can be effectively exhausted from the exhaust opening. Therefore, it can be restrained that concentration (partial pressure) of gas (for example, oxygen) filling the retainer body decreases. Accordingly, there is an effect that gas dissolved in liquid can be effectively substituted by gas (for example, oxygen) filling the retainer body.

According to the gas substitution apparatus in a ninth aspect, in addition to effects of the gas substitution apparatus in any of the second to eighth aspects, the supply opening and the exhaust opening are formed on a ceiling surface of the retainer body, and a formation position of the supply opening is positioned at a position nearer to the inner surface wall than a formation position of the exhaust opening. Therefore, it can be increased contact chance between gas (for example, oxygen) filling the retainer body and liquid (for example, water). Accordingly, there is an effect that gas dissolved in liquid can be effectively substituted by gas (for example, oxygen) filling the retainer body.

According to the gas substitution apparatus in a tenth aspect, in addition to effects of the gas substitution apparatus in any of the second to ninth aspects, the exhaust opening has an enlarged opening portion which is enlarged from the ceiling side toward the bottom side of the retainer body and is formed on the ceiling surface, and the opening of the ceiling side of the ventilation path is arranged within an area where the enlarged portion of the exhaust opening is formed when seen from an axial direction of the inner surface wall. Therefore, gas (for example, nitrogen) released from liquid (for example, water) by substitution can be accumulated in the enlarged portion. Thereby, gas (for example, nitrogen) released from liquid by substitution can be effectively exhausted from the exhaust opening and it can be restrained that gas (for example, nitrogen) released from liquid by substitution mutually contacts with liquid. Thus, there is an effect that gas dissolved in liquid can be effectively substituted by gas (for example, oxygen) filling the retainer body.

According to the gas substitution apparatus in an eleventh aspect, in addition to effects of the gas substitution apparatus in any of the second to tenth aspects, the inflow opening, is arranged so that a discharge direction of the liquid (for example, water) faces to the extended direction of the rectification board. Therefore, it can be restrained that liquid flowing through the inflow opening collides with the rectification boards or the inner surface wall, as a result, thrust force of liquid is weakened. That is to say, thin water membrane is formed on the surface of the rectification board by raising centrifugal force of liquid flowing down, thereby contact chance between gas (for example, oxygen) filling the retainer body and liquid can be increased. Further, by raising centrifugal force of liquid, it can be raised the effect that gas (for example, nitrogen) released from liquid by substitution is separated from liquid. Therefore, there is an effect that gas dissolved in liquid can be effectively substituted by gas (for example, oxygen) filling the retainer body.

BRIEF DESCRIPTION OF DRAWINGS

FIG. 2(a) is a sectional view of the gas substitution apparatus sectioned along a IIa-IIa line in FIG. 1, FIG. 2(b) is a sectional view of the gas substitution apparatus sectioned along a IIb-IIb line in FIG. 1, FIG. 2(c) is a sectional view of the gas substitution apparatus sectioned along a IIc-IIc line in FIG. 1, and FIG. 2(d) is a sectional view of the gas substitution apparatus sectioned along a line IId-IId in FIG. 1.

FIG. 5(a) is a sectional view showing the gas substitution apparatus partially enlarged, according to a second embodiment, and FIG. 5(b) is a sectional view showing the gas substitution apparatus partially enlarged, according to a third embodiment.

DESCRIPTION OF EMBODIMENTS

Figure 1:
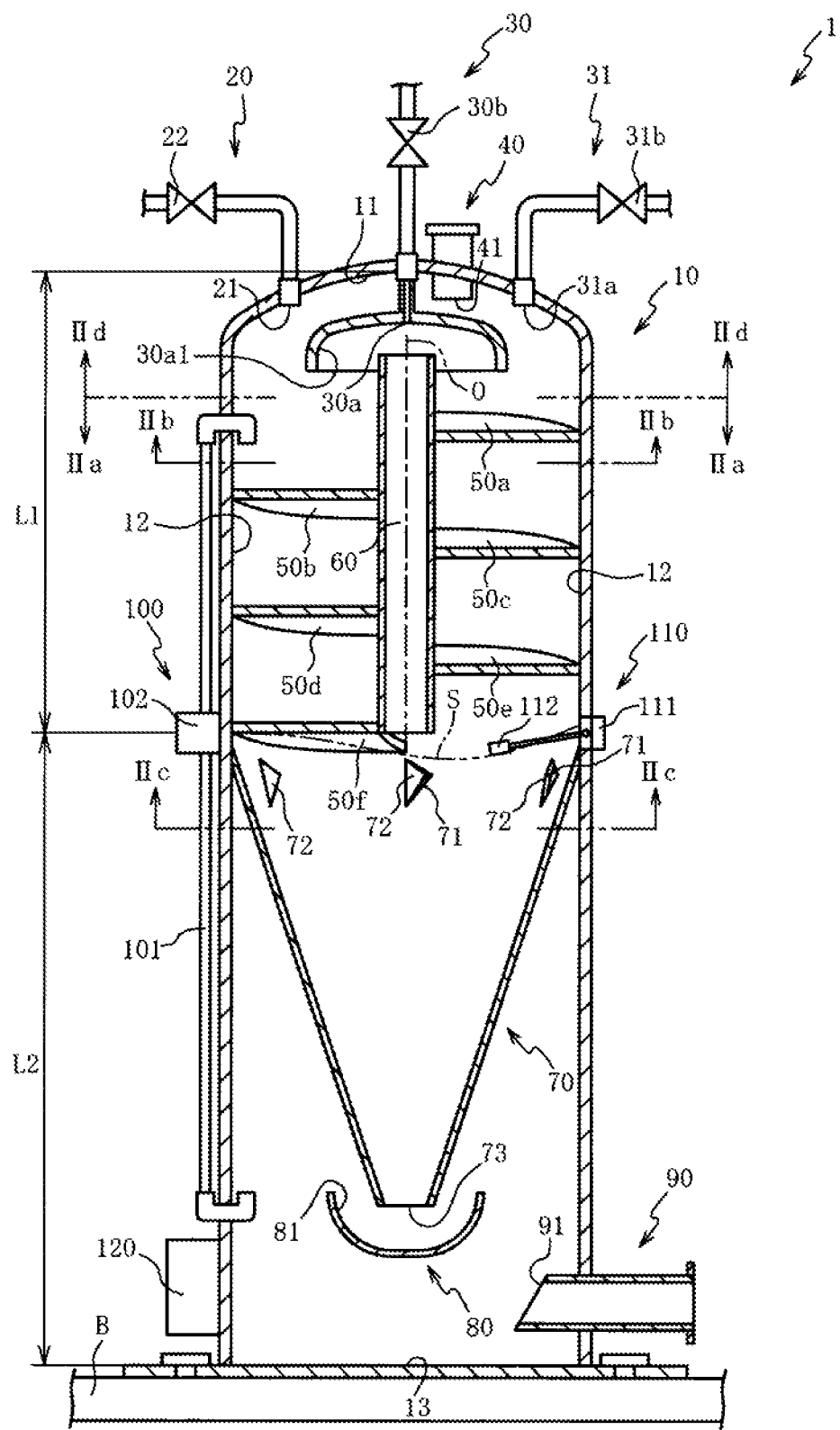
FIG. 1 is a sectional view of the gas substitution apparatus in one embodiment according to the present invention.

Hereinafter, the preferred embodiments of the present invention will be described with reference to the drawings. First, with reference to FIGS. 1 and 2, whole construction of the gas substitution apparatus 1 will be described. FIG. 1 is a sectional view of the gas substitution apparatus 1 in one embodiment according to the present invention. FIG. 2(a) is a sectional view of the gas substitution apparatus 1 sectioned along a IIa-IIa line in FIG. 1, FIG. 2(b) is a sectional view of the gas substitution apparatus 1 sectioned along a IIb-IIb line in FIG. 1, FIG. 2(c) is a sectional view of the gas substitution apparatus 1 sectioned along a IIc-IIc line in FIG. 1, and FIG. 2(d) is a sectional view of the gas substitution apparatus 1 sectioned along a line IId-IId in FIG. 1. Here, in order to easily understand, the gas substitution apparatus 1 is indicated by omitting a part thereof and by omitting a part of hatching in FIG. 1, and the gas substitution apparatus 1 is indicated by omitting a part thereof in FIG. 2.

The gas substitution apparatus 1 is, for example, an apparatus in which gas dissolved in water (contamination water) taken from water area to be purified such as rivers or wetlands is substituted by oxygen and the obtained process water is again provided (flowing out, sending water) to the water area to be purified. In case that the processed (oxygen is dissolved) water processed by the gas substitution apparatus 1 is provided in the water area to be purified, dissolved oxygen (DO) quantity in the water area to be purified increases, thereby microbes in the water area to be purified is activated. As a result, decomposition of organic substances in the water area to be purified is promoted and water quality in the water area to be purified can be improved.

As shown in FIGS. 1 and 2, the gas substitution apparatus 1 is an apparatus which is installed on a base B becoming foundation, thus the gas substitution apparatus 1 has a retainer body 10 which is made of noncorrosive material such as stainless steel or hard synthesized resin (for example, FRP) and has pressure tightness so as not to be broken even when inner pressure thereof is pressurized more than atmospheric pressure.

The retainer body 10 has a ceiling surface 11 spherically curved, an inner surface wall 12 with circular horizontal sectional plane extended from end portion (peripheral parts) of the ceiling surface 11 toward a bottom side (side of base B) of the retainer body 10 and a bottom surface 13 continuously formed from lower end portion of the inner surface wall 12, thereby inner space with circular horizontal sectional plane is formed within the retainer body 10.

Here, in explanation described hereafter, an axis of the inner surface wall 12 is defined as axis O, a ceiling surface 11 side of the retainer body 10 is defined as ceiling side and a side of the bottom surface 13 of the retainer body 10 is defined as bottom side.

At the upper side (upper side of FIG. 1) of the retainer body 10, an oxygen supply pipe 20 for supplying oxygen from an oxygen supply source is connected and a supply opening 21 is opened on the ceiling surface 11. Further, to the oxygen supply pipe 20, an oxygen supply valve 22 which is constructed from an electromagnetic valve is provided.

At the center of an upper surface (upper surface of FIG. 1) of the retainer body 10, an exhaust pipe 30 to exhaust gas in the retainer body 10 is connected, thus an exhaust opening 30*a* is opened on the ceiling surface 11. To the exhaust opening 30*a*, it is formed an enlarged opening portion 30*a*1 with an enlarged diameter is enlarged from the ceiling side toward the bottom side. The supply opening 21 is arranged at the inner surface wall 12 side than the outer side of the lower end of enlarged opening portion 30*a*1 when seen from the axis O direction. Furthermore, to the exhaust pipe 30, an exhaust valve 30*b* constructed from an electromagnetic valve is arranged and is controlled to open/close by a control device 120 described hereinafter.

Oxygen is supplied into the retainer body 10 by adjusting divergence of the oxygen supply valve 22 under a state that the exhaust valve 30*b* is closed, and gas (nitrogen in the embodiment) occurring corresponding to substitution process by the gas substitution apparatus 1 mentioned later is exhausted to outside of the retainer body 10 by leaving the exhaust valve 30*b* open under a state that the oxygen supply valve 22 is closed.

To the upper surface of the retainer body 10, it is connected an exhaust pipe 31 to exhaust gas in the retainer body 10 by manual operation and an exhaust opening 31*a* is formed and opened on the ceiling surface 11. To this exhaust pipe 31, it is arranged an exhaust valve 31*b* which can open/close by manual operation, thereby gas in the retainer body 10 can be voluntarily exhausted.

Here, as the oxygen supply source, for example, it can be exemplified a high pressure oxygen cylinder in which oxygen is press-fitted with high pressure. However, the oxygen supply source is not limited to this high pressure oxygen cylinder. For example, as the oxygen supply source, it may be utilized an oxygen generator which can supply oxygen by extracting oxygen (oxygen gas) in the atmosphere and pressurizing oxygen.

Furthermore, to the upper surface of the retainer body 10, it is connected an inflow pipe 40 to make water (contamination water) taken by a pump (not shown) from the water area to be purified such as river or wetlands flow in the retainer body 10 and an inflow opening 41 is formed at a position protruded downward from the ceiling surface 11. That is to say, the inflow pipe 40 is arranged (see FIG. 2(*b*)) so that the inflow opening 41 faces toward an upper surface (upper surface of FIG. 1) of a rectification board 50*a* mentioned later, thus water taken from the pump flows down on the upper surface of the rectification board 50*a* from the inflow opening 41.

On the inner surface wall 12, a plurality (six in the embodiment) of rectification boards 50*a* to 50*f*, each of which is spirally extended, are arranged along direction of the axis O at regular intervals (in the order of rectification board 50*a*, 50*b*, 50*c*, 50*d*, 50*e* and 50*f* from upper side along direction of axis O) and the inflow opening 41 is arranged at an upper side of an upstream end of the rectification board 50*a*.

The rectification boards 50*a* to 50*f* are formed into a plate-like shape protruded toward the axis O from the inner surface wall 12, and each of the rectification boards 50*a* to 50*f* is extended over a semicircle of the inner surface wall 12. Each of the rectification boards 50*a* to 50*f* is arranged in turn while moving phase by 180°, and the downstream side end and the upstream side end of each of rectification boards 50*a* to 50*f* are mutually arranged so as to retain posture to make a clearance therebetween for the axis O direction (for example, a step for the axis O direction is formed between the downstream side end of the rectification board 50*a* and the upstream side end of the rectification board 50*b*, and the similar step for the axis O direction is formed between two adjacent rectification boards among the rectification boards 50*a* to 50*f*). That is to say, each of the rectification boards 50*a* to 50*f* is arranged in a form to divide the spiral and the step for the axis O direction is formed in such dividing area (see FIG. 3).

At a center position of the inner surface wall 12 when seen along a plane passing the axis O, a cylindrical ventilation pipe 60 with openings formed at both the ceiling side and the bottom side is arranged. An outer diameter of the ventilation pipe 60 is set smaller than an inner diameter of the lower end in the enlarged opening portion 30*a*1 and the ventilation pipe 60 is arranged at the axis O side position than the inner diameter of the lower end in the enlarged opening portion 30*a*1 when seen along the plane passing the axis O (see FIG. 2(*d*)). That is, when seen from the axis O direction, the exhaust opening 30*a* is arranged at a position overlapped with the ceiling side opening of the ventilation pipe 60.

Further, to the outer peripheral of the ventilation pipe 60, the inner peripheral of each rectification board 50*a* to 50*f* is connected. Thereby, since the ventilation pipe 60 is supported to the inner surface wall 12 through the rectification boards 50*a* to 50*f*, it is unnecessary to use individual support member to support the ventilation pipe 60 at the center of the inner surface wall 12. As a result, parts number can be restrained.

At the lower end of the outer peripheral of the ventilation pipe 60 (lower end in FIG. 1), the rectification board 50*f* is connected and the lower end of the ventilation pipe 60 is arranged at the position upper than the downstream side end of the rectification board 50*f*. Further, it is arranged a radial contract member 70 which has a cone shape becoming narrower toward the bottom side of the retainer body 10, at the position having substantially same height as the downstream side end of the rectification board 50*f*.

The outer upper peripheral of the radial contract member 70 is connected to the inner surface wall 12, thereby the radial contract member 70 is formed as the wall surface continuously formed to the inner surface wall 12. The radial contract member 70 has a plurality of communication openings 71 (six communication openings in the embodiment) formed at regular intervals along the upper side peripheral direction of the radial contract member 70, a blade portion 72 formed in each of the communication openings 71 and an opening portion 73 formed at the lower end of the radial contract member 70. By this radial contract member 70, the inside of the retainer body 10 is partitioned into the ceiling side and the bottom side.

The communication openings 71 are holes to communicate the inside to the outside of the radial contract member 70. Each of the communication openings 71 is formed by putting a cut in the wall surface of the radial contract member 70 and folding the cut portion toward inner peripheral side of the radial contract member 70. Here, the folded portion corresponds to the blade portion 72. That is to say, the blade portion 72 is formed as the plate continuous to the inner peripheral side of the radial contract member 70 and the end along the rotational direction of spiral of the rectification boards 50*a* to 50*f* (rotational direction of water flowing down according to spiral) is formed so as to stretch for the inner peripheral side of the radial contract member 70 (for example, the blade 72 shown in FIG. 1 is formed so that the right side end of the blade 72 is stretched toward front side of the paper).

The blade portion 72 is connected at the opposite side end to rotational direction of water in the communication opening 71 and the communication opening 71 is formed in a shape so that the opening faces to rotational direction of water (for example, the communication opening 71 shown in FIG. 1 is formed in a shape so that the opening faces to the right side).

The opening portion 73 is formed as a circular opening by cutting the lower end of the radial contract member 70 and a buffer member 80 is arranged at the lower position of the opening portion 73. The buffer member 80 has a concave surface 81 which is formed by spherically deforming in concave toward the bottom side of the retainer body 10. An outer edge of the concave surface 81 is formed larger than the diameter of the opening portion 73. Further, when seen from the axis O direction, the opening portion 73 is arranged at a lower position than the outer edge of the concave surface 81 and at an inner position than the outer edge of the concave surface 81.

At the side surface (right surface in FIG. 1) of the retainer body 10 positioned at the bottom side lower than the buffer member 80, it is arranged a cylindrical outflow pipe 90 through which the inside and outside of the retainer body 10 communicate and an outflow opening 91 is formed in the inner side of the retainer body 10. The outflow opening 91 is formed as an oval opening by diagonally cutting the end of the outflow pipe 90. The outflow pipe 90 is arranged in a shape so that the outflow opening 91 faces to the ceiling side.

Furthermore, at the side surface of the retainer body 10, it is arranged detectors 100, 110 to detect the water level in the retainer body 10 (height position of water surface S) and a control device 120 to control the oxygen supply valve 22 and the exhaust valve 30b.

The detector 100 has a water level gauge 101 made of a light transmissive material such as glass or resin and a water level sensor 102 to detect a liquid surface position within the water level gauge 101. The water level gauge 101 is cylindrically formed and both ends thereof communicate with the inside of the retainer body 10. Here, the upper one end communicates with the inner surface wall 12 positioned at the upper position than the rectification board 50b and the other end communicates with the inner surface wall 12 at the position with height substantially same as the opening portion 73. The water level sensor 102 is arranged at the position with height same as the lower end of the ventilation pipe 60.

The detector 110 is a water level sensor having a sensor part 111 and a float 112 formed capable of floating on water surface. The detector 110 is arranged at the same position as the lower end of the ventilation pipe 60.

When the water level (water surface S) of water accumulated in the bottom side of the retainer body 10 is raised or dropped, the liquid surface within the water level gauge 101 is raised or dropped, thereby the liquid surface position is detected by the water level sensor 102. Further, when the water level is raised or dropped, the float 112 is raised or dropped, thereby the water level is detected by the sensor part 111 based on the height position of the float 112.

The control device 120 controls open/close of the oxygen supply valve 22 according to the water level detected by the detectors 100, 110 and supply quantity of oxygen (pressure in the retainer body 10) is adjusted so that the water level is positioned at the height of the lower end of the ventilation pipe 60. Here, open/close of the oxygen supply valve 22 may be controlled by a timer.

Here, the length L2, which is defined by a distance from the bottom surface 13 to the water level sensor 102 (lower end of the ventilation pipe 60), is made longer than the length L1, which is defined by a distance from the water level sensor 102 (lower end of the ventilation pipe 60) to the ceiling surface 11. That is to say, water level is controlled by the control device 120 so that water volume accumulated in the retainer body 10 becomes larger than oxygen volume filling the retainer body 10. Thereby, accumulated water functions as a wall, as a result, oxygen filling the retainer body 10 can be restrained to flow out from the outflow pipe 90 with water.

Further, the control device 120 controls open/close of the exhaust valve 30b corresponding to the detection result obtained by the sensor (not shown) detecting oxygen quantity dissolved in water flowing out from the outflow pipe 90 and the sensor (not shown) detecting oxygen concentration in the retainer body 10, and when oxygen concentration or oxygen quantity dissolved in water in the retainer body 10 becomes lower value than a predetermined value, the exhaust valve 30b is opened. Here, it may be conceivable that the exhaust valve 30b is intermittently opened or closed by a timer. Further, it may be conceivable that a manual oxygen supply valve, a safety valve or a pressure valve is arranged on the upper surface (ceiling surface 11) of the retainer body 10.

Figure 3:
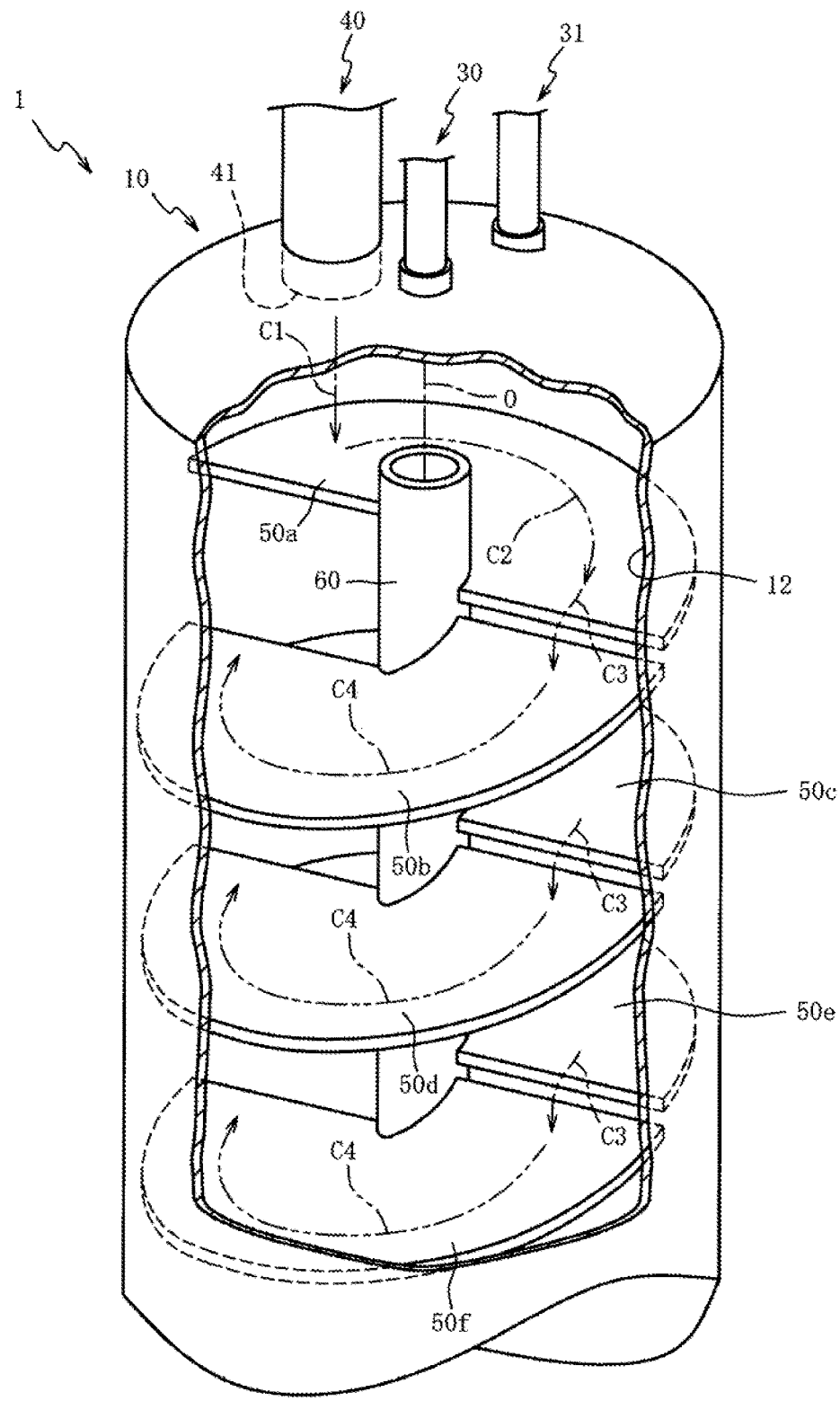
FIG. 3 is a perspective view showing the gas substitution apparatus partially sectioned.
Figure 4:
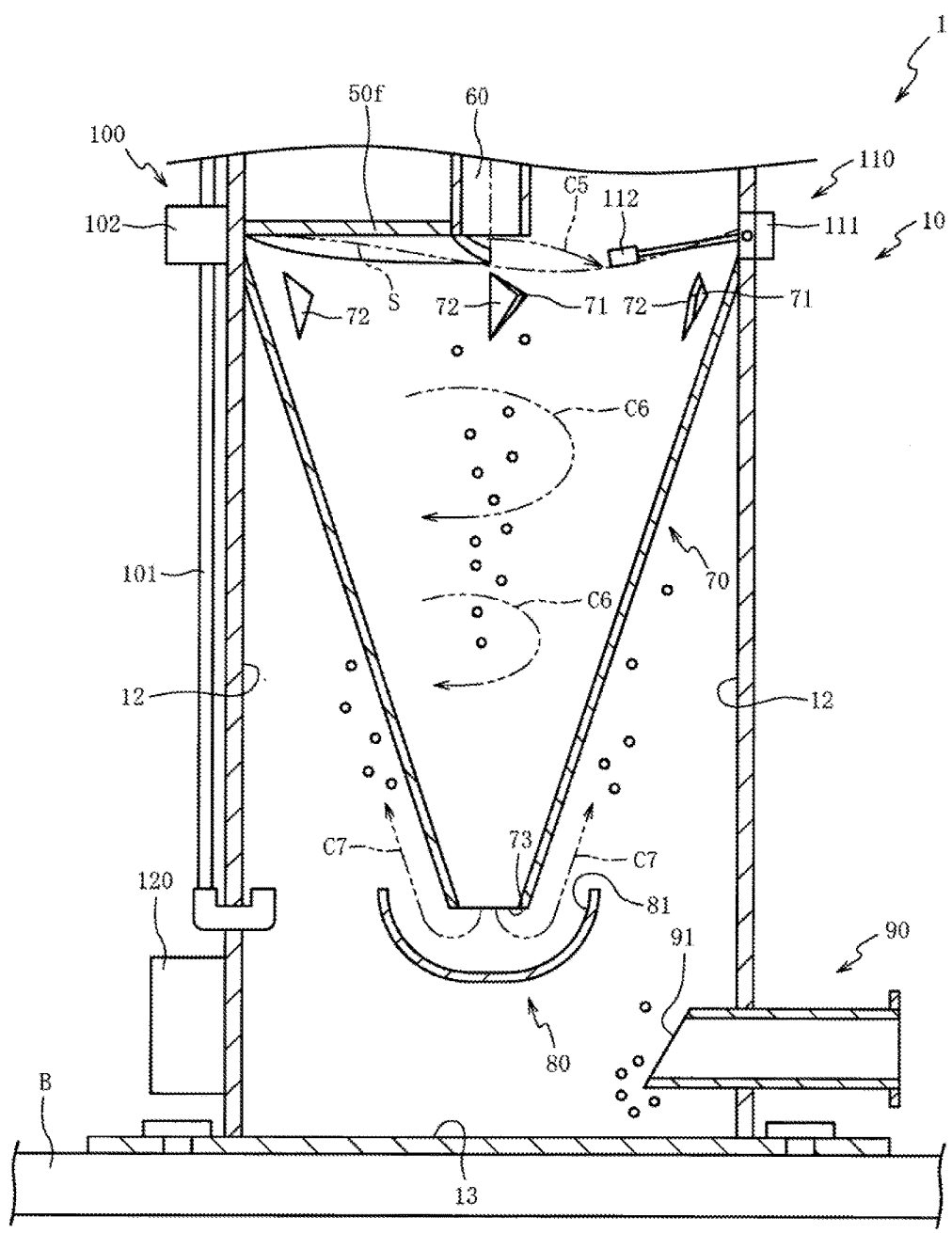
FIG. 4 is a sectional view showing the gas substitution apparatus partially enlarged.

Next, with reference to FIGS. 3 and 4, it will be described an embodiment in which gas dissolved in water is substituted by oxygen, through the gas substitution apparatus 1 constructed as described above. FIG. 3 is a perspective view showing the gas substitution apparatus 1 partially sectioned. FIG. 4 is a sectional view showing the gas substitution apparatus 1 partially enlarged. Here, arrows in two-dot chain lines in FIGS. 3 and 4 respectively indicate movement course of water in the retainer body 10.

As shown in FIGS. 3 and 4, water (contamination water) taken by a pump (not shown) and in which nitrogen is dissolved is discharged from the inflow opening 41 (movement course C1) in the retainer body 10 filled with oxygen by pressurizing over the atmospheric pressure. Oxygen pressure in the retainer body 10 is pressurized to a pressure slightly higher than the atmospheric pressure. In the present embodiment, oxygen pressure is pressurized to a pressure of 0.05 Mpa.

Here, since the inflow opening 41 is arranged so that the discharge direction of water faces to the upper surface of the rectification board 50a, water discharged from the inflow opening 41 flows down while rotating in spiral state along the upper surface of the rectification board 50a and is rectified (movement course C2).

Thereby, water flowing down while rotating on the upper surface of the rectification board 50a contacts with oxygen and oxygen is dissolved in water. Therefore, nitrogen dissolved from the beginning in water (gas dissolved in water from the beginning under the atmospheric pressure) is released from water. That is to say, since oxygen fills the retainer body 10 under a pressure higher than the atmospheric pressure under which nitrogen is dissolved in water, gas dissolved in water is substituted from nitrogen by oxygen based on such pressure difference (solubility of gas for water is proportional to a gas pressure and to partial pressure of gas in case of mixed gas (Henry's Law)).

Since nitrogen released from water has mass smaller than water, nitrogen is separated from water by centrifugal force of water, thus nitrogen gathers near the axis O (outer peripheral surface of the ventilation pipe 60). In this case, water flows down while rotating in spiral state along the peripheral direction of the inner surface wall 12 and it is formed cavities without water between the peripheral surface of the ventilation pipe 60 and flowing water. Therefore, nitrogen can be moved toward the ceiling side through cavities.

Thereby, since nitrogen can be effectively exhausted from the exhaust opening 30a, accumulation of nitrogen in the inside of the retainer body 10 can be restrained. Thus, drop of oxygen concentration (partial pressure) in the retainer body 10 can be restrained and oxygen quantity dissolved in water can be increased (that is to say, when partial pressure of nitrogen in the retainer body 10 becomes high, substitution by oxygen is inhibited.

Here, water has high viscosity, thus thin water membrane cannot be formed by freely falling water in the retainer body. As a result, contact area between water and oxygen cannot be secured. Contrarily, according to the gas substitution apparatus 1 of the present embodiment, since a plurality of rectification boards 50a to 50f are extended in spiral to the inner surface wall 12, water is rectified by the rectification boards 50a to 50f while rotating in spiral. Therefore, in comparison with a case that water flows down by free-fall, thinner water membrane can be formed on the surface of the rectification boards 50a to 50f.

Further, since water flows down on the upper surface of the rectification boards 50a to 50f arranged in spiral, flow-down distance of water can be made long in comparison with a case that water freely falls. Accordingly, contact chance of water and oxygen can be increased. Further, when seen from the axis O direction, since the supply opening 21 is arranged at the side of the inner surface wall 12 nearer than the outer periphery of the lower end of the enlarged opening portion 30a1, contact chance of water flowing down while rotating along the peripheral direction of the inner surface wall 12 and oxygen can be increased.

Water rotating on the upper surface of the rectification board 50a flows down onto the rectification board 50b while retaining centrifugal force (rotation force) by the rectification board 50a which is slanted downward in spiral (movement course C3). Water flowing down from the rectification board 50a onto the rectification board 50b is rectified while rotating on the upper surface of the rectification board 50b by the centrifugal force (movement course C4). Thereafter, water flows down through each of the rectification board 50c to 50f while tracing the movement course similar to the movement courses C3, C4.

In this case, since the upstream side ends of the rectification boards 50a to 50f are separately arranged along the axis O direction against the downstream side ends thereof (for example, the upstream side end of the rectification board 50b is separately arranged along the lower side of the axis O direction against the downstream side end of the rectification board 50a), contact chance between water and oxygen can be increased when water flows down (drops) through the step formed between each of rectification boards 50a to 50f. That is to say, entire surface of water forming thin water membrane can be exposed to oxygen (sandwiching water membrane by oxygen, therefore contact area between water and oxygen can be increased.

Further, since the rectification boards 50a to 50f are arranged while retaining posture in which the rectification boards 50a to 50f are slanted downward in spiral, sedimentation of foreign substance on the upper surface of the rectification boards 50a to 50f can be restrained, thereby centrifugal force of water can be raised.

Here, although nitrogen released from water is separated by the centrifugal force of water and gathers near the axis O, a part of nitrogen moves to the bottom side of the retainer body 10 (lower side than the rectification board 50f) with water flowing down. In this case, since the ventilation pipe 60 having the openings to both the ceiling side and bottom side is provided and cavities without water are formed between the outer peripheral surface of the ventilation pipe 60 and water flowing down, nitrogen moving to the bottom side of the retainer body 10 through the ventilation pipe 60 and cavities can be moved to the ceiling side and can be effectively exhausted from the exhaust opening 30a.

In this case, since the exhaust opening 30a is provided at the position overlapping with the ceiling side opening of the ventilation pipe 60 when seen along the axis O direction, nitrogen moving to the ceiling side can be easily exhausted through the cavities or the ventilation pipe 60 between the outer peripheral surface of the ventilation pipe 60 and rotating water. Further, since the enlarged opening portion 30a1 the opening of which is enlarged from the ceiling side of the retainer body 10 toward the bottom side is formed at the exhaust opening 30a and the ventilation pipe 60 arranged at the position nearer to the axis O side than the inner periphery of the lower end of the enlarged opening portion 30a1 when seen from the axis O direction, nitrogen moving to the ceiling side can be accumulated in the enlarged opening portion 30a1. Thereby, it can be restrained that nitrogen moving to the ceiling side and water mutually contact and nitrogen can be easily exhausted from the exhaust opening 30a.

As mentioned above, by moving nitrogen moved to the bottom side of the retainer body 10 to the ceiling side and exhausting, it can be restrained that nitrogen accumulates in the retainer body 10. Therefore, it can be restrained that oxygen concentration (partial pressure) within the retainer body 10 drops, thus oxygen quantity dissolved in water can be increased.

Further, since nitrogen moving to the ceiling side and water flowing down is sectioned by the ventilation pipe 60, it can be restrained that nitrogen and water contact with each other. Furthermore, since the ventilation pipe 60 is arranged to position nearer to axis O than the rectification boards 50a to 50f, a part of cavities formed near the axis O by the water flowing down while rotating can function as the ventilation pipe 60. Therefore, space to provide the ventilation pipe 60 can be omitted and production cost of the gas substitution apparatus 1 can be restrained.

Water flowing down from the rectification boards 50a to 50f flows down in the radial contract member 70 (movement course C5, see FIG. 4) from the bottom rectification board 50f. In this case, since the radial contract member 70 is formed into a conic shape becoming narrower toward the bottom side, water flowing down while rotating from the rectification board 50f retains its centrifugal force and whirlpool is generated in water flowing down at the inner peripheral side of the radial contract member 70 (water accumulated in the inner peripheral side of the radial contract member 70) (movement course C6).

In this case, the blade portion 72 is formed as a plate continuously formed on the inner peripheral surface of the radial contract member 70, the end of spiral rotation direction side of the rectification boards 50a to 50f is formed so as to stretch to the inner peripheral surface side of the radial contract member 70 and is connected to the end opposite to the rotation direction of water in the communication opening 71 (communication opening 71 is formed so that the opening thereof faces to the rotation direction side of water). Therefore, water rotating in the inner peripheral surface side of the communication opening 71 rotates along the blade portion 72. That is to say, even if the communication opening 71 is formed, it can be restrained that thrust force (centrifugal force) of water is weakened and whirlpool can be easily generated in accumulated water.

In addition, the length L2 from the bottom surface 13 to the water level sensor 102 (lower end of the ventilation pipe 60) is made longer than the length L1 from the water level sensor 102 (lower end of the ventilation pipe 60) to the ceiling surface 11 (that is, water level is controlled by the control device 120 so that volume of water accumulated within the retainer body 10 becomes larger than the volume of oxygen filled within the retainer body 10). Therefore, length of whirlpool generated in accumulated water (length of up and down direction) can be made long. Thereby, nitrogen can be effectively separated through centrifugal force of water (whirlpool) (nitrogen can be gathered in the center of whirlpool).

As mentioned, whirlpool is generated in water accumulated in the bottom side and nitrogen is gathered in the center of whirlpool (near the axis O) by centrifugal force of whirlpool. Thereby, nitrogen can be surfaced from the center of whirlpool. That is to say, nitrogen surfaced from accumulated water can be moved to the ceiling side through cavities generated between the outer peripheral surface of the ventilation pipe 60 and water flowing down while rotating or the ventilation pipe 60. Thereby, nitrogen mixed in accumulated water can be effectively exhausted from the exhaust opening 30a, therefore it can be restrained that oxygen concentration (partial pressure) in the inside of the retainer body 10 is decreased. Thus, oxygen quantity dissolved in water can be increased.

Water flowing down from the opening portion 73 of the radial contract member 70 further flows down in the buffer member 80 arranged at the lower position of the opening portion 73 (movement course C7). Thereby, it can be restrained that water flowing down from the opening portion 73 and the bottom surface 13 (surface of water accumulated) mutually collide and it can be restrained that oxygen dissolved in water is released from water due to collision.

Water flowing down from the opening portion 73 to the bottom surface 13 flows to the outside of the retainer body 10 from the outflow opening 91 and is accumulated within the retainer body 10, further water level is controlled by the control device 120 so as to be positioned at the lower end of the ventilation pipe 60.

In this case, when nitrogen is mixed in water flowing down from the opening portion 73, bubbles thereof are raised from the opening portion 73 and are accumulated between the outer peripheral surface of the radial contract member 70 and the inner surface wall 12, therefore concentration of oxygen dissolved in water is decreased. On the contrary, according to the gas substitution apparatus 1 of the present embodiment, the communication openings 71 are arranged at the upper end of the radial contract member 70 and the inner peripheral side and the outer peripheral side of the radial contract member 70 communicate through the communication openings 71, thus it can be permitted that bubbles of nitrogen mixed in water accumulated in the bottom side of the retainer body 10 moves from the outer peripheral side to the inner peripheral side of the radial contract member 70.

Further, the buffer member 80 arranged at the lower side of the opening portion 73 has the concave surface 81 which is formed in concave toward the bottom side, therefore water flowing down from the opening portion 73 flows along the concave surface 81 and water stream toward the upper side from the opening portion 73 is formed (movement course C7). Thereby, bubbles of nitrogen mixed in water can be guided to the communication opening 71, thus nitrogen can be moved to the ceiling side without being accumulated in the bottom side (between outer peripheral surface of the radial contract member 70 and inner surface wall 12).

Further, even if bubbles of nitrogen flow down to the position lower than the outflow opening 91, the outflow pipe 90 is arranged so that the outflow opening 91 faces to the ceiling side. Thereby, it can be restrained that bubbles of nitrogen flow out of the outside of the retainer body 10 (it can be restrained that nitrogen flows out to the water area to be purified). That is to say, bubbles of nitrogen can be guided to the communication opening 71 and moved to the inner peripheral side of the radial contract member 70, without flowing out of the outside of the retainer body 10.

As mentioned, by moving nitrogen mixed in the outer peripheral side of the radial contract member 70 to the inner peripheral side of the radial contract member 70 through the communication openings 71, nitrogen can be effectively exhausted from the exhaust opening 31a through the ventilation pipe 60 by using whirlpool function described in the above. Therefore, it can be restrained that oxygen concentration (partial pressure) within the retainer body 10 decreases and oxygen quantity dissolved in water can be increased.

Here, although water accumulated in the bottom side is adjusted so that water level becomes the height near the lower end of the ventilation pipe 60, water level is not always constant and changes to the upper or lower height than the lower end of the ventilation pipe 60. In this case, since the lower end of the ventilation pipe 60 is positioned at the position upper than the downstream end of the rectification board 50f, water path of rotating water can be formed around the space (outer peripheral side) between the lower end of the ventilation pipe 60 and accumulated water, even if water level of accumulated water is positioned at the position lower than the lower end of the ventilation pipe 60. Thereby, nitrogen surfaced from the center of whirlpool of accumulated water can be exhausted from the exhaust opening 30a through cavities between the outer peripheral surface of the ventilation pipe 60 and water flowing down while rotating or the ventilation pipe 60.

As mentioned in the above, according to the gas substitution apparatus 1 of the present embodiment, gas dissolved in water can be effectively substituted from nitrogen by oxygen. Further, comparing with the apparatus in which oxygen is dissolved in water by aeration, oxygen content of water can be raised and it can be restrained that bubbles of oxygen flow out to the water area to be purified.

Next, a second and a third embodiments will be described with reference to FIG. 5. In a first embodiment, although it is described the apparatus 1 in which the inflow pipe 40 is arranged so that the inflow opening 41 faces to the upper surface of the rectification board 50a, it will be described in the second embodiment and the third embodiment an apparatus in which inflow pipes 240, 340 are arranged so that inflow openings 241, 341 faces to the downstream side of the rectification board 50a (extended direction of the spiral rectification board 50a). Hereinafter, the same references used in the first embodiment will be added to the elements and parts same as the elements in the first embodiment, and descriptions thereof are omitted.

FIG. 5(a) is a sectional view showing the gas substitution apparatus 1 partially enlarged, according to the second embodiment. FIG. 5(b) is a sectional view showing the gas substitution apparatus 1 partially enlarged, according to the third embodiment. Here, in FIG. 5, in order to easily understand, the gas substitution apparatus will be indicated by omitting a part thereof.

As shown in FIG. 5(a), the inflow pipe 240 in the second embodiment is cylindrically formed, and the top end (end of rectification board 50a side) is diagonally cut, thereby the oval inflow opening 241 is formed. The inflow pipe 240 is arranged so that the inflow opening 241 faces to the downstream side of the rectification board 50a (extended direction of the spiral rectification board 50a, right side of FIG. 5(a)).

Thereby, since water flowing out from the inflow opening 241 is discharged toward the downstream side of the rectification board 50a (movement course C201), thrust force (centrifugal force) along the rotation direction of the rectification board 50a can be raised, in comparison with a case that water is dropped on the upper surface of the rectification board 50a. Therefore, since thinner water membrane can be formed and nitrogen can be easily separated by centrifugal force of water (nitrogen can be easily gathered near the axis O), gas dissolved in water can be effectively substituted from nitrogen by oxygen.

As shown in FIG. 5(b), the inflow pipe 340 in the third embodiment is cylindrically formed and the top end (end of rectification board 50a side) is formed so as to bend in L-shape. The inflow pipe 340 is arranged so that the inflow opening 341 faces to the downstream side of the rectification board 50a (extended direction of spiral rectification board 50a, right side of FIG. 5(b)).

Thereby, since water flowing out from the inflow opening 341 moves toward the downstream side of the rectification board 50a and is discharged along the upper surface of the rectification board 50a (movement course C301), it can be restrained that thrust force of water is weakened due to that water collides with the rectification board 50a and thrust force of water (centrifugal force) along the rotation direction of the rectification board 50a can be more raised. Therefore, since thinner water membrane can be formed and nitrogen can be easily separated by centrifugal force of water (nitrogen can be easily gathered near the axis O), gas dissolved in water can be effectively substituted from nitrogen by oxygen.

As mentioned, although the present invention is explained based on the embodiments, the present invention is not limited to the above embodiments. It will be easily guessed that various modifications and changes can be done within a scope of the present invention.

In each embodiment, although it is described a case in which gas filling the retainer body 10 is oxygen, the present invention is not necessarily limited to these embodiments. For example, gas may be ozone, nitrogen, hydrogen or carbon dioxide and various kinds of function water can be obtained by substituting gas dissolved in water with ozone, nitrogen, hydrogen or carbon dioxide. In this case, by substituting gas dissolved in water with ozone or hydrogen, ozone or hydrogen can be safely transported and utilized with water. In a case that gas dissolved in water is substituted by ozone, water with deodorization or sterilization function can be obtained.

Further, by substituting gas dissolved in water with carbon dioxide, water suitable for algal culture can be obtained, and by substituting gas dissolved in water with nitrogen, water capable of restraining oxidation can be obtained.

Although, in each embodiment, it is described a case that liquid to which substitution process is done is contamination water (that is, gas dissolved in liquid from the beginning is nitrogen), it is not necessarily limited to this case. For example, solution in which substance is dissolved may be conceivable. As one example, seawater (salt water) can be raised. Although seawater in which salt is dissolved has a low solubility of oxygen in comparison with water, oxygen can be dissolved in seawater with high concentration according to the gas substitution apparatus 1 of the embodiments. Thereby, seawater suitable for culture of marine products can be obtained.

Although in each embodiment it is described a case that gas to fill the retainer body 10 is only oxygen, it is not necessarily limited to this case. For example, gas to fill the retainer body 10 may be mixed gas. As one example, it may be raised biogas chief ingredient of which is methane gas and carbon dioxide or effluent gas of thermal power station. In a case that gas filling the retainer body 10 is biogas, carbon dioxide included in biogas can be dissolved in water and only methane gas can be exhausted from the exhaust opening 30a according to the gas substitution apparatus 1 of the present embodiment. That is to say, among ingredient of biogas, methane gas can be used as fuel gas by exhausting only methane gas and water in which only carbon dioxide is dissolved can be used as water for algal culture.

Further, in a case that exhaust gas of thermal power station is used as gas filling the retainer body 10, since carbon dioxide included in exhaust gas can be dissolved in water, therefore such water can be used for algal culture. That is to say, exhaust gas can be effectively utilized without releasing carbon dioxide in the atmosphere.

In each embodiment, although it is described a case that pressure within the retainer body 10 is 0.05 Mpa, it is not necessarily limited to this case. Pressure of gas filling the retainer body 10 is suitable within a range of 0.01 Mpa to 0.1 Mpa.

When pressure of gas is lower than 0.01 Mpa, substitution efficiency to substitute gas dissolved in water from nitrogen by oxygen decreases and when pressure of gas is higher than 0.1 Mpa, oxygen is apt to be released from water due to that water flows out from the retainer body 10 (when pressure of retainer body 10 is larger than 0.1 Mpa, oxygen is apt to be released by becoming bubbles due to pressure difference according to that water flows out from the retainer body 10 and pressure returns to the atmospheric pressure). That is to say, by setting pressure of gas (oxygen) filling the retainer body 10 from 0.01 Mpa to 0.1 Mpa, gas dissolved in water can be effectively substituted.

Although in each embodiment it is described a case that the ventilation pipe 60 is arranged in the center of the inner surface wall 12, it is not necessarily limited to this case. For example, it may be conceivable that the ventilation pipe 60 is arranged between the inner surface wall 12 and the rectification boards 50a to 50f. That is to say, it may be suitable that the ventilation pipe has at least openings at the ceiling side and the bottom side and it is formed an area where gas is movable to the ceiling side without contacting with water. In this case, when the ventilation pipe is not arranged in the center of the retainer body 10, cavities are formed near the axis O by rotating water, therefore it can be permitted that nitrogen moves to the ceiling side through cavities and ventilation pipe.

Although in each embodiment it is described a case that the ventilation pile 60 is cylindrical (linear in the axis O direction), it is not necessarily limited to this case. For example, the ventilation pipe 60 may be constructed so as to be bent. That is to say, it may be suitable that the ventilation pipe 60 has at least openings at the ceiling side and the bottom side and it is formed an area where gas is movable to the ceiling side.

Although in each embodiment it is described a case that the inner periphery of each of the rectification boards 50a to 50f is connected to the outer peripheral surface of the ventilation pipe 60, it is not necessarily limited to this case.

For example, it may be conceivable that a member to connect the inner surface wall 12 or the radial contract member 70 and the ventilation pipe 60 is separately provided, thereby the ventilation pipe 60 is supported.

Although in each embodiment it is described a case that the rectification boards 50a to 50f are arranged so that spiral formed by the rectification boards 50a to 50f is divided and the step in the axis direction O is formed in each divided portion, it is not necessarily limited to this case. For example, it may be conceivable that spiral is continuously formed by one rectification board.

In the second and the third embodiments, although it is described a case that the inflow pipes 240, 340 are arranged so that the inflow openings 241, 341 face the downstream side of the rectification board 50a, it is not necessarily limited to this case. For example, it may be conceivable that the cylindrical inflow pipe is arranged so that the inner periphery thereof is provided along the tangent line of the inner surface wall 12 (construction that inflow opening is arranged so that the discharge direction of water faces a direction along the tangent line of the inner surface wall 12).

Thereby, since thrust force of water (centrifugal force) along the peripheral direction of the rectification board 50a can be raised in comparison with a case that water is dropped on the upper surface of the rectification board 50a, thinner water membrane can be formed in the rectification boards 50a to 50f and it can be restrained that nitrogen gathering near the axis O and water mutually contact.

The invention claimed is:

1. A gas substitution apparatus comprising:
a retainer body filled with gas under a state that the gas is pressurized more than an atmospheric pressure;
a supply opening configured to supply the retainer body with the gas;
a rectification board formed so as to protrude from an inner surface wall of the retainer body and to be extended along the inner surface wall;
an inflow opening arranged at an upper position than the rectification board and configured to let liquid flow in an inside from an outside of the retainer body;
an outflow opening connected to a lower end of the inner surface wall and configured to let the liquid flowing down to a bottom of the retainer body flow out of the outside of the retainer body; and
an exhaust opening arranged at an upper position than the rectification board and configured to exhaust the gas in the inside of retainer body to the outside of the retainer body,
wherein a ventilation path including openings at both a ceiling side and a bottom side of the retainer body in an area where the rectification board is arranged,
wherein the ventilation path and a flow path through which the liquid flows down are partitioned,
wherein the inner surface wall is formed so as to have a circular section,
wherein the rectification board is extended in spiral along the inner surface wall,
wherein a plurality of the rectification boards are arranged in an axial direction of the inner surface wall, and
wherein the rectification boards are arranged so as to divide a spiral and each of the rectification boards is arranged so as to be mutually separated at a divided portion in the axial direction of the inner surface wall.

2. A gas substitution apparatus comprising:
a retainer body filled with gas under a state that the gas is pressurized more than an atmospheric pressure;
a supply opening configured to supply the retainer body with the gas;
a rectification board formed so as to protrude from an inner surface wall of the retainer body and to be extended along the inner surface wall;
an inflow opening arranged at an upper position than the rectification board and configured to let liquid flow in an inside from an outside of the retainer body;
an outflow opening connected to a lower end of the inner surface wall and configured to let the liquid flowing down to a bottom of the retainer body flow out of the outside of the retainer body; and
an exhaust opening arranged at an upper position than the rectification board and configured to exhaust the gas in the inside of retainer body to the outside of the retainer body,
wherein a ventilation path including openings at both a ceiling side and a bottom side of the retainer body in an area where the rectification board is arranged,
wherein the ventilation path and a flow path through which the liquid flows down are partitioned,
wherein the inner surface wall is formed so as to have a circular section,
wherein the rectification board is extended in spiral along the inner surface wall,
wherein the ventilation path is arranged at an axial side of the inner surface wall nearer than the rectification board, and
wherein the exhaust opening is arranged at a position at least overlapping with the opening formed on the ceiling side of the ventilation path when seen from an axial direction of the inner surface wall.

3. The gas substitution apparatus according to claim 2, further comprising a radial contract member arranged at a lower position than the area where the rectification board is arranged, the radial contract member being formed as a wall with a cone shape becoming narrower toward the bottom side of the retainer body,
wherein an outer periphery of an upper end of the radial contract member is connected to the inner surface wall and an opening portion is formed at a lower end of the radial contract member.

4. The gas substitution apparatus according to claim 3, further comprising communication openings formed at an upper end side of the radial contract member, the communication openings through which an inner peripheral side and an outer peripheral side of the radial contract member communicate.

5. The gas substitution apparatus according to claim 4, further comprising a buffer member arranged at a lower position than the opening portion and including a concave surface concaved toward the bottom side of the retainer body.

6. The gas substitution apparatus according to claim 2,
wherein the lower end of the ventilation path is positioned at an upper position than a lower end of the area where the rectification boards are arranged.

7. A gas substitution apparatus comprising:
a retainer body filled with gas under a state that the gas is pressurized more than an atmospheric pressure;
a supply opening configured to supply the retainer body with the gas;
a rectification board formed so as to protrude from an inner surface wall of the retainer body and to be extended along the inner surface wall;

an inflow opening arranged at an upper position than the rectification board and configured to let liquid flow in an inside from an outside of the retainer body;

an outflow opening connected to a lower end of the inner surface wall and configured to let the liquid flowing down to a bottom of the retainer body flow out of the outside of the retainer body; and an exhaust opening arranged at an upper position than the rectification board and configured to exhaust the gas in the inside of retainer body to the outside of the retainer body, wherein a ventilation path including openings at both a ceiling side and a bottom side of the retainer body in an area where the rectification board is arranged, wherein the ventilation path and a flow path through which the liquid flows down are partitioned, wherein the inner surface wall is formed so as to have a circular section, wherein the rectification board is extended in spiral along the inner surface wall, wherein the supply opening and the exhaust opening are formed on a ceiling surface of the retainer body, and wherein a formation position of the supply opening is positioned at a position nearer to the inner surface wall than a formation position of the exhaust opening.

8. A gas substitution apparatus comprising:

a retainer body filled with gas under a state that the gas is pressurized more than an atmospheric pressure;

a supply opening configured to supply the retainer body with the gas;

a rectification board formed so as to protrude from an inner surface wall of the retainer body and to be extended along the inner surface wall;

an inflow opening arranged at an upper position than the rectification board and configured to let liquid flow in an inside from an outside of the retainer body;

an outflow opening connected to a lower end of the inner surface wall and configured to let the liquid flowing down to a bottom of the retainer body flow out of the outside of the retainer body; and an exhaust opening arranged at an upper position than the rectification board and configured to exhaust the gas in the inside of retainer body to the outside of the retainer body, wherein a ventilation path including openings at both a ceiling side and a bottom side of the retainer body in an area where the rectification board is arranged, wherein the ventilation path and a flow path through which the liquid flows down are partitioned, wherein the inner surface wall is formed so as to have a circular section, wherein the rectification board is extended in spiral along the inner surface wall, wherein the exhaust opening includes an enlarged opening portion which is enlarged from the ceiling side toward the bottom side of the retainer body and is formed on the ceiling surface of the retainer body, and wherein the opening of the ceiling side of the ventilation path is arranged within an area where the enlarged portion of the exhaust opening is formed when seen from an axial direction of the inner surface wall.

* * * * *